United States Patent Office 3,850,885
Patented Nov. 26, 1974

3,850,885
METHOD FOR MAKING POLYETHERIMIDES
Tohru Takekoshi, Scotia, N.Y., and John E. Kochanowski, Pittsfield, Mass., assignors to General Electric Company
No Drawing. Filed Nov. 23, 1973, Ser. No. 418,523
Int. Cl. C08g 20/32
U.S. Cl. 260—47 CZ                      11 Claims

ABSTRACT OF THE DISCLOSURE

A method is provided for making polyetherimides through an imide-amine exchange reaction catalyzed by Group (II–V)b basic metals and compounds derived therefrom. Displacement of organic monoamine from bis-(N-organophthalimide) is effected under melt conditions with organic diamine. The polyetherimide can be used as an injection moldable thermoplastic.

---

The present invention relates to a catalyzed method for making polyetherimides involving an imide-amine exchange reaction between an organic diamine and a bis-(N-organophthalimide) under melt conditions.

There is taught in copending application of Darrell R. Heath and Tohru Takekoshi, Ser. No. 346,473, filed Mar. 30, 1973, and assigned to the same assignee as the present invention, that aromatic bis(ether anhydride)s can be made by the hydrolysis of an intermediate aromatic bis-(etherphthalimide), as shown by the following equation:

(I)

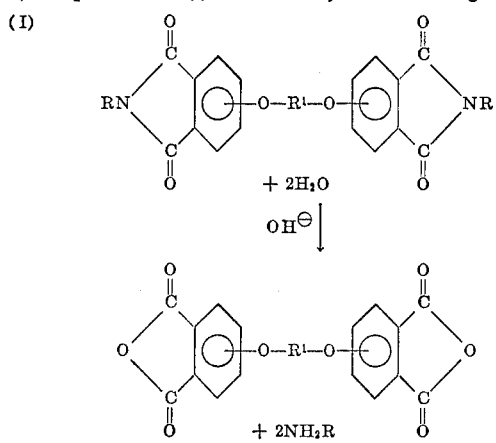

wherein R and R¹ are as defined below.

The above aromatic bis(ether anhydride)(s) can then be employed to make polyimides by effecting reaction between the bis(ether anhydride) and an organic diamine. Although making polyimides by reacting aromatic bis-(ether anhydride)(s) and organic diamines provide valuable results, the aromatic bis(ether anhydride) as shown by the above equation requires the base catalyzed hydrolysis of the corresponding bisimide. The hydrolysis of the bisimide is effected to produce an intermediate tetra-acid salt followed by acidification of the tetra-acid and the dehydration to the aromatic bis(ether anhydride). It woud be desirable to make polyetherimides by an alternative method which does not require the use of aromatic bis(ether anhydride). The steps needed to make the dianhydride intermediate would thus be eliminated.

As shown in the copending application of Tohru Takekoshi (Docket RD-5705), filed concurrently herewith, and assigned to the same assignee as the present invention, polyetherimides also can be made by an imide-amine exchange reaction between an organic diamine and a bis(N-organophthalimide) in the presence of an alkali metal or alkaline earth metal, or basic compound thereof, such as potassium carbonate. Although there is no necessity for isolating an aromatic bis(ether anhydride) as described above in Ser. No. 346,473, the time required for polymerization can be several hours or more. As a result, undesirable side reactions such as oxidation of the organic diamine can occur at elevated temperatures. In addition, the intrinsic viscosity of the polyetherimide is generally below 0.3.

The present invention is based on the discovery that polyetherimides can be made directly from aromatic bis-(etherphthalimide)s of formula I, without converting such aromatic bis(etherphthalimide) to the corresponding aromatic bis(ether anhydride). The results of the present invention are achieved by utilizing organic diamine of the formula, (II) $\quad\quad\quad NH_2—R^2—NH_2$ in combination with such aromatic bis(etherphthalimide) in the presence of a basic catalyst selected from elements of Group II-b, Group III-b, Group IV-b, and Group V-b, and compounds thereof, whereby an imide-amine exchange reaction is effected resulting in the displacement of organic monoamine by the above-described organic diamine of formula II. In addition, unlike the results achieved in copending application, Ser. No. 346,473 with alkali metal, alkaline earth metal or basic compounds thereof, the reaction time for achieving polyetherimide intrinsic viscosity of 0.35 or greater is substantially lessened.

As employed hereinafter, R is a monovalent $C_{(1-20)}$ organic radical selected from $C_{(1-8)}$ alkyl radicals and $C_{(6-20)}$ aromatic radicals, $R^1$ is selected from $C_{(6-30)}$ divalent aromatic organic radicals, and $R^2$ is a divalent organic radical selected from the class consisting of (a) aromatic hydrocarbon radicals having from 6–20 carbon atoms and halogenated derivatives thereof, (b) alkylene radicals $C_{(2-8)}$ alkylene terminated polydiorganosiloxane, cycloalkylene radicals having from 2–20 carbon atoms, and (c) divalent radicals included by the formula,

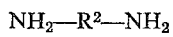

where Q is a member selected from the class consisting of

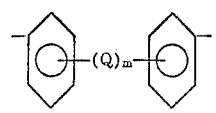

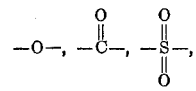,  and $x$ is a whole number from 1 to 5 inclusive, and $m$ is 0 or 1.

There is provided by the present invention a method for making a polyetherimide which comprises,
(1) effecting the removal of organic amine of the formula,
(III) $\quad\quad\quad RNH_2$ from a melt consisting essentially of a mixture of the bisimide of formula I, and at least an equal molar amount of such bisimide of an organic diamine of formula II in the presence of an effective amount of a basic catalyst selected from the class consisting of Group II–b, Group III–b, Group IV–b and Group V–b elements and basic compounds thereof, where the vapor pressure of the organic amine is greater under atmospheric conditions than the vapor pressure of the organic diamine, where R is as previously defined.

Radicals included by $R^1$ are more particularly

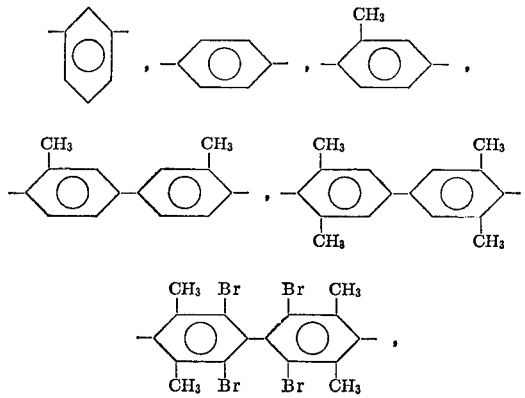

and

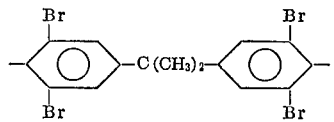

and divalent organic radicals of the general formula

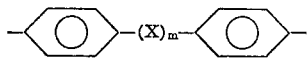

where X is a member selected from the class consisting of divalent radicals of the formulas —$C_yH_{2y}$—,

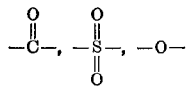

and —S—, where m is as previously defined, y is a whole number from 1 to 5.

Catalysts which can be utilized in the practice of the invention are, for example, Group II–b metals such as zinc and cadmium; basic Group II–b metal compounds such as zinc oxide, zinc acetate, cadmium acetate, mercuric acetate; Group III–b metals such as aluminum, etc.; Group III–b compounds such as Thallous acetate; Group IV–b compounds such as tin oxide and lead acetate; and Group V–b compounds such as antimony oxide, antimony acetate and bismuth acetate.

Further examples of basic catalysts which can be employed in the invention within the scope of Group (II–V)b elements and basic compounds are shown in Hackh's Chemical Dictionary, Fourth Edition (1969), McGraw-Hill Book Company, New York. Additional basic zinc compounds can be found on pages 735–736; basic cadmium compounds can be found on pages 120–121; aluminum compounds can be found on pages 31–32; antimony compounds can be found on pages 53–54, etc. In addition, certain transition metals such as cobalt, nickel, iron, and manganese also have been found effective. An effective amount of the basic catalyst is from 0.005% to 2% and more particularly from 0.01% to 0.1% by weight, based on the weight of bis(etherphthalimide) and organic diamine.

As shown in copending application, Ser. No. 346,473, the aromatic bis(etherphthalimide)s of formula I can be made by effecting the nitro displacement of a nitrophthalimide, for example, N-phenyl-3-nitrophthalimide, N-phenyl-4-nitrophthalimide, with an alkali diphenoxide such as the sodium or potassium salt of such dihydric phenols as bisphenol-A, 2,2-bis(2-hydroxyphenyl)-propane, etc. The aforementioned nitrophthalimide can be made by effecting reaction between the corresponding nitrophthalic anhydride and an organic amine of formula III, such as, for example, aniline, toluidine, etc.

Included by the oganic diamines of formula II are, for example, m-phenylenediamine;
p-phenylenediamine;
4,4'-diaminodiphenylpropane;
4,4'-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbeenzidine;
3,3'-dimethoxybenzidine;
2,4-bis(β-amino-t-butyl)toluene;
bis(p-β-amino-t-butylphenyl)ether;
bis(p-β-methyl-o-aminopentyl)benzine;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane; etc.

Additional examples of the dihydric phenols used to make the alkali diphenoxides employed to make the aromatic bis(etherimide)s of formula I are, for example, 2,2-bis(2-hydroxyphenyl)propane;
2,4'-dihydroxydiphenylmethane;
bis(2-hydroxyphenyl)methane;
2,2-bis(4-hydroxyphenyl)propane hereinafter identified as "bisphenol-A" or "BPA";
1,1-bis(4-hydroxyphenyl)ethane;
1,1-bis(4-hydroxyphenyl)propane;
2,2-bis(4-hydroxyphenyl)pentane;
3,3-bis(4-hydroxyphenyl)pentane;
4,4'-dihydroxybiphenyl;
4,4'-dihydroxy-3,3',5,5'-tetramethylbiphenyl;
2,4'-dihydroxybenzophenone;
4,4'-dihydroxydiphenyl sulfone;
2,4'-dihydroxydiphenyl sulfone;
4,4'-dihydroxydiphenyl sulfoxide;
4,4'-dihydroxydiphenyl sulfide;
hydroquinone;
resorcinol;
3,4'-dihydroxydiphenylmethane;
4,4'-dihydroxybenzophenone;
and 4,4'-dihydroxydiphenyl ether.

In the practice of the invention, a mixture of equal molar amounts of aromatic bis(etherphthalimide) of formula I, and organic diamine of formula II, is heated until the mixture is at least partially converted to a melt. Stripping along with agitation of the melt facilitates the initial removal of the mono organic amine and the eventual removal of the organic diamine in instances where an excess amount of the latter is utilized.

Depending upon such factors as the nature of the aromatic bis(etherphthalimide) and the organic diamine, the glass transition temperature of the resulting polyetherimide, the boiling range of the mono organic amine, the degree of agitation such as by stirring, etc., temperatures between about 200° C.–400° C., and preferably from 230° C. to 300 C. can be employed. The order of addition of the catalyst to the mixture of ingredients of the organic diamine and the aromatic bis(etherphthalimide) is not critical. Preferably, the catalyst is incorporated into the mixture of ingredients prior to converting the mixture to the molten state. The employment of reduced pressure, such as from 0.1 to 100 torr during the course of the imide-amine exchange reaction has been found to facilitate the removal of the mono organic amine and the formulation of the polyetherimide. Reaction time can vary from 0.5 hours to 1.5 hours or more depending upon a variety of factors such as the degree of agitation, the temperature of the polymerization mixture, the temperature of the melt, the nature of the reactants, etc.

Although equal molar amounts of the organic diamine and the aromatic bis(etherphthalimide) provide for high molecular weight polyetherimide, in certain instances an excess of the organic diamine can be employed resulting in the production of polyetherimide having terminal amine groups. The polyetherimide made in accordance with the practice of the invention consists essentially of chemically combined polyetherimide units of the formula,

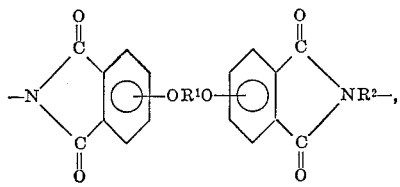

and can have an intrinsic viscosity in dimethylformamide at 25° C. of 0.3 to 0.6. These polyimides are injection moldable and can be reinforced with finely divided fillers such as silica, carbon whiskers, glass fibers, etc. having 20 to 100 parts of filler per 100 parts of polymer.

In order that those skilled in the art will be better able to practice the invention, the following examples are given by way of illustration and not by way of limitation. All parts are by weight.

EXAMPLE 1

A mixture of 2,2 - bis[4'-N-phenylphthalimid-4-oxy)phenyl]propane (5.000 parts), 4,4'-methylenedianiline (1.522 parts) and zinc acetate dihydrate (0.0016 part) was stirred under nitrogen at 230° C. and 60 torr for 45 minutes. Aniline formed and it was distilled off. The viscous melt was further heated at 260° C. and 0.15 torr for 60 minutes, and at 290° C. and 0.15 torr for an additional 60 minutes. A tough, amber colored polymer was obtained on cooling. The intrinsic viscosity of the polymer in dimethylformamide was 0.35 dl./g.

Based on method of preparation, the polymer was a polyetherimide consisting essentially of the following chemically combined units,

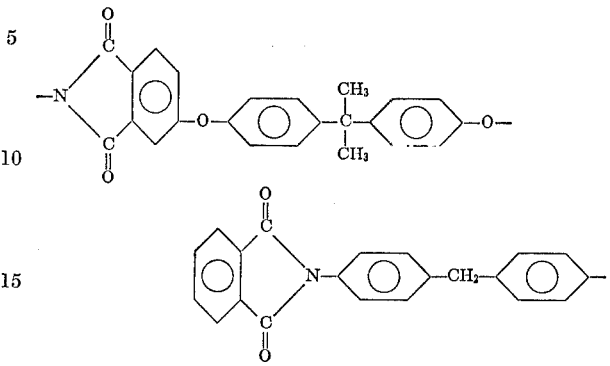

The above polymerization was repeated, except that the reaction was conducted in the absence of catalyst. There was obtained a polyetherimide having an intrinsic viscosity of 0.19. After a three-hour total polymerization time, little change if any was noted in the intrinsic viscosity of the polyetherimide.

An additional polymerization was conducted following the same procedure, except that an equivalent weight of potassium carbonate was employed in place of the zinc acetate. There was obtained a polyetherimide having an intrinsic viscosity of 0.28. However, the latter intrinsic viscosity was obtained only after a longer polymerization period, such as the three hours used in the reaction free of catalyst.

Based on the above results, those skilled in the art would know that the catalyst employed in the present invention provides a high intrinsic viscosity in a shorter rection period than mixtures free of catalysts, or catalysts such as alkali metal compounds.

EXAMPLE 2

A mixture of 5.000 parts of 2,2-bis[4-(N-phenylphthalimid-4-oxy)phenyl]propane, 1.537 parts of 4,4'-oxydianiline and 0.0016 part of zinc acetate was heated and stirred under the same condition as described in Example 1. A dark amber-colored polymer having an intrinsic viscosity of 0.58 dl./g. in dimethylformamide was obtained. Based on method of preparation, there was obtained a polyetherimide consisting essentially of the following chemically combined units,

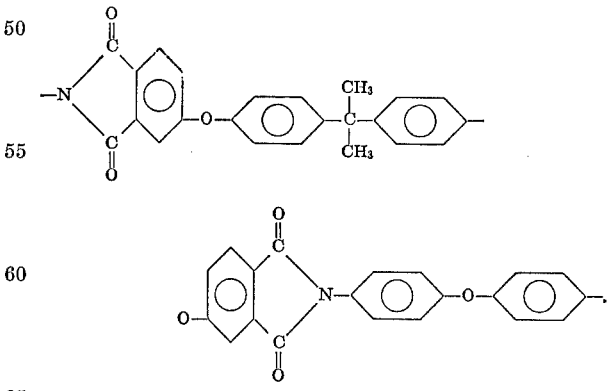

EXAMPLE 3

A mixture of 3.303 parts of 4,4'-bis(N-phenylphthalimid-4-oxy)diphenyl sulfide, 0.5569 part of m-phenylenediamine, and 0.00073 part of antimony trioxide was stirred under nitrogen at 240° C. and 60 torr for 30 minutes. During the reaction, aniline was distilled off. The reaction mixture was further heated at 270° C. and 0.3 torr for 40 minutes and allowed to cool. There was obtained a product having an inherent viscosity of 0.21 in m-cresol. Based on method of preparation the product was a polyetherimide consisting essentially of the following chemically combined units,

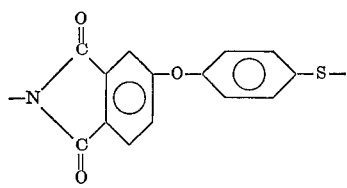

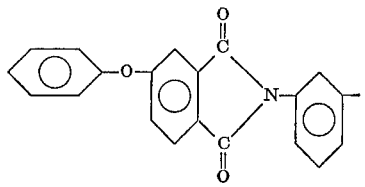

EXAMPLE 4

A mixture of 3.653 parts of 1,4-bis(N-phenylphthalimido)benzene, 0.9040 part of heptamethylenediamine and 0.0017 part of thallous acetate was stirred at 240° C. and 70 torr for 45 minutes during which time the aniline was distilled off. The resulting viscous melt was further heated at 280° C. and 0.5 torr for 15 minutes and cooled. A tough yellow polymer was dissolved in about 100 parts of a phenol-toluene (7:3) mixture. The solution was poured in methanol, stirred in a blender and the white fibrous polymer was isolated. The polymer had an inherent viscosity of 1.47 in m-cresol. Based on method of preparation, the polymer was a polyetherimide consisting essentially of the following chemically combined units,

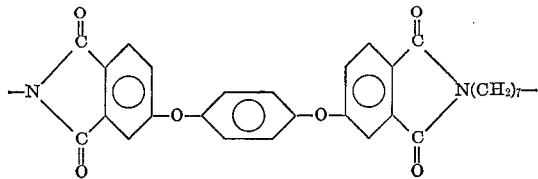

EXAMPLE 5

A mixture of 4.024 parts of 2,2-bis[4-(N-phenylphthalimid-4-oxy)phenyl]propane, 1.225 part of 4,4'-methylenedianiline and 0.0035 part of aluminum foil was heated with stirring under a nitrogen atmosphere at 250° C. and 60 torr for 45 minutes, at 250° C. and 10 torr for 15 minutes, and at 270° C. and 0.5 torr for 30 minutes. On cooling, an amber colored, glassy polymer was obtained. The inherent viscosity of the polymer was 0.44 in m-cresol (C=0.39). Based on method of preparation, the polymer was a polyetherimide consisting essentially of the same chemically combined units as example 1.

EXAMPLE 6

A mixture of 26.96 parts of 4,4'-bis(N-phenylphthalimid-4-oxy)diphenyl ether, 8.624 parts of m-phenylenediamine, and 0.016 part of lead (II) acetate trihydrate was heated at 240° C. under nitrogen atmosphere for 15 minutes. The heating was continued at 250° C. and 20 torr for 30 minutes during which time aniline was continuously distilled off. The resulting viscous melt was further heated at 250° C. and 0.5 torr for an additional 30 minutes. On cooling, a dark brown polymer was obtained, having an inherent viscosity in m-cresol of 0.17. Based on method of preparation, the polymer was a polyetherimide consisting essentially of chemically combined units of the formula,

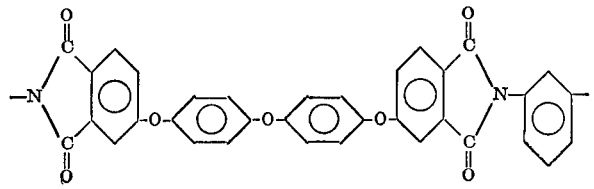

EXAMPLE 7

A mixture of 32.28 parts of 2,2-bis[4-(N-phenylthalimid-4-oxy)phenyl]propane, 8.076 parts of heptamethylenediamine and 0.016 part of cadmium acetate dihydrate was stirred and heated at 200° C. under nitrogen atmosphere for one hour during which time methylamine gas evolved. The clear yellow melt was further heated at 220° C. and 0.5 torr for one hour and at 240° C. for an additional 0.5 hour. The yellow tough polymer was obtained on cooling. The inherent viscosity of the polymer was 0.71 in m-cresol (at 0.5% conc.). Based on method of preparation the polymer was a polyetherimide of the formula,

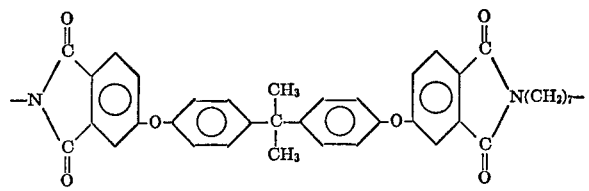

Although the above examples are limited to only a few of the very many polyetherimides which can be made by the method of the invention and catalysts used thereby, it should be understood that the present invention is based on the reaction of bisimides of formula I, and organic diamine of formula II in the presence of an effective amount of a Group (II–V)b element or basic compound as a catalyst.

What we claim as new and desire to secure by Letters Patent of the United States is:

1. A method for making a polyetherimide which comprises
    (1) effecting the removal of organic amine of the formula,

from a melt consisting essentially of a mixture of bisimide of the formula

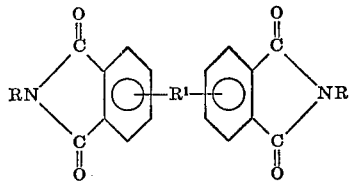

and at least an equal molar amount of such bisimide of an organic diamine of the formula,

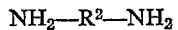

In the presence of an effective amount of a catalyst, selected from the class consisting of a Group II–b, Group III–b, Group IV–b and Group V–b element, oxides of such elements, and salts of such elements, where the vapor pressure of the organic amine is greater under atmospheric conditions than the vapor pressure of the organic diamine, where R is a monovalent $C_{(2-20)}$ organic radical selected from $C_{(2-8)}$ alkyl radicals and $C_{(6-20)}$ aromatic radicals, $R^1$ is selected from $C_{(6-30)}$ aromatic radicals, and $R^2$ is a divalent organo radical selected from the class consisting of (a) aromatic hydrocarbon radicals having from 6–20 carbon atoms and halogenated derivatives thereof, (b) alkylene radicals, $C_{(2-8)}$ alkylene terminated polydiorganosiloxane cyclo-alkylene radicals having from 2–20 carbon atoms, and (c) divalent radicals included by the formula,

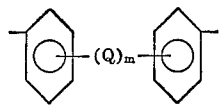

where Q is a member selected from the class consisting of

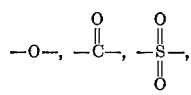

—S—, —$C_xH_{2x}$— and $x$ is a whole number from 1 to 5 inclusive, and $m$ is 0 or 1.

2. A method in accordance with claim 1 wherein the bisimide is 2,2 - bis[4-(N-phenylphthalimid-4-oxy)phenyl]-propane.

3. A method in accordance with claim 1 where the bisimide is 2,2 - bis[4-(N-phenylphthalimid-3-oxy)phenyl]-propane.

4. A method in accordance with claim 1 wherein the organic diamine is methylene dianiline.

5. A method in accordance with claim 1 wherein the organic diamine is oxydianiline.

6. A method in accordance with claim 1 where the catalyst is antimony oxide.

7. A method in accordance with claim 1, where the catalyst is zinc acetate.

8. A method in accordance with claim 1, where the catalyst is cadmium acetate.

9. A method in accordance with claim 1, where the catalyst is thallous acetate.

10. A method in accordance with claim 1, where the catalyst is aluminum metal.

11. A method in accordance with claim 1, where the catalyst is lead acetate.

References Cited
UNITED STATES PATENTS
3,736,290   5/1973   Fessler _____ 260—46.5

LESTER L. LEE, Primary Examiner

U.S. Cl. X.R.
260—47 CP, 78 TF